May 15, 1923.

S. W. MANNING 1,455,643

FOLLOWER RING

Filed Dec. 10, 1921

S. W. Manning, INVENTOR

BY Victor J. Evans ATTORNEY

May 15, 1923.
S. W. MANNING
FOLLOWER RING
Filed Dec. 10, 1921
1,455,643
2 Sheets-Sheet 2
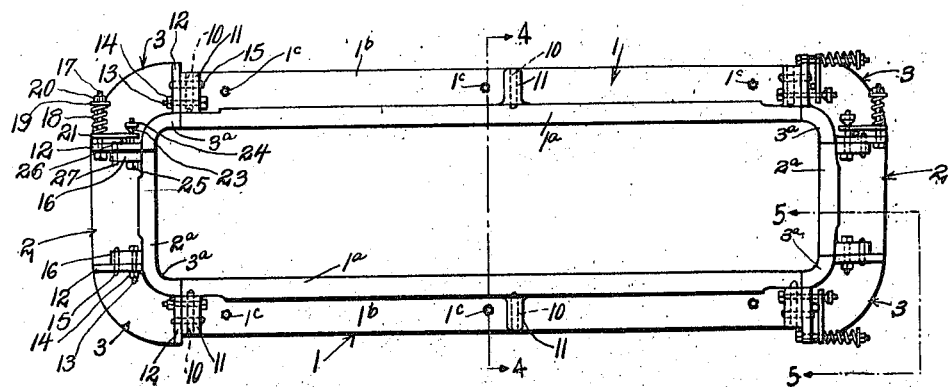
FIG. 3.
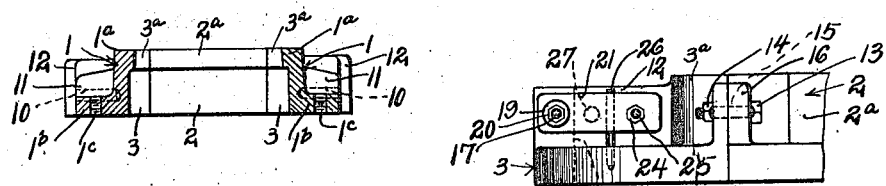
FIG. 4.
FIG. 5.
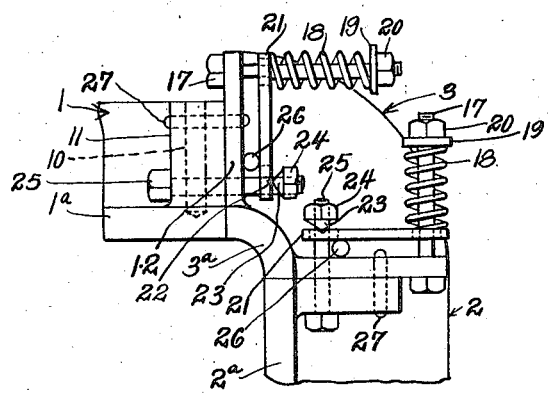
FIG. 6.
S. W. Manning, INVENTOR
BY Victor J. Evans
ATTORNEY.

Patented May 15, 1923.

1,455,643

UNITED STATES PATENT OFFICE.

STEPHEN W. MANNING, OF ALTOONA, PENNSYLVANIA.

FOLLOWER RING.

Application filed December 10, 1921. Serial No. 521,518.

*To all whom it may concern:*

Be it known that I, STEPHEN W. MANNING, a citizen of the United States, residing at Altoona, in the county of Blair and State of Pennsylvania, have invented new and useful Improvements in Follower Rings, of which the following is a specification.

This invention relates to devices for use in forming glass caskets and other large articles of glass, and more particularly to what I term a follower ring.

One of the main objects of the invention is to provide a follower ring which fits snugly about the movable member of the mold used in forming the article, this ring being capable of relatively great expansion and contraction so as to prevent breakage of the ring. A further object is to provide a ring of the character stated of simple construction and operation which may be readily produced at small cost, and in which the sections of the ring are normally held in close contact with each other. Further objects will appear from the detailed description.

In the drawings:—

Figure 3 is an underneath view of the ring;

Figure 4 is a section taken substantially on line 4—4 of Figure 3;

Fig. 5 is a fragmentary detail of the portion of the ring contained within the lines 5—5 of Fig. 3.

Figure 6 is an enlarged fragmentary detail of the connection between two of the ring sections.

It is the present practice in forming caskets and similar large objects of pressed glass to place the molten glass in a lower mold provided with a suitable recess, after which an upper mold is forced into the lower mold, this upper mold operating through a follewer ring which fits snugly about the sides and ends of the upper mold and is pressed against the upper face of the lower mold by a spring plate, this follower ring serving to prevent flow of the molten glass from the upper edge of the space between the two molds so as to insure proper forming of the article to be produced. The rings at present in use are cast in a single piece. As these rings fit snugly about the upper or movable mold, as above described, and as this mold is heated to a high temperature by the molten glass and expands at a greater rate than the follower ring, these rings are frequently broken by expansion of the upper mold thus necessitating frequent renewing of the rings which materially increases the cost of production. The primary object of this invention is to provide a follower ring which will normally fit snugly about the upper mold section for the purpose above specified, this ring being capable of expanding in accordance with expansion of the mold so as to eliminate breakage of the ring.

Figure 1:
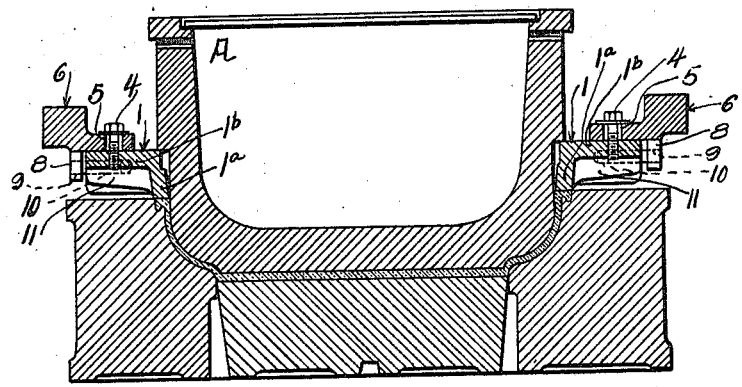
Figure 1 is a sectional view showing the ring as applied.
Figure 2:
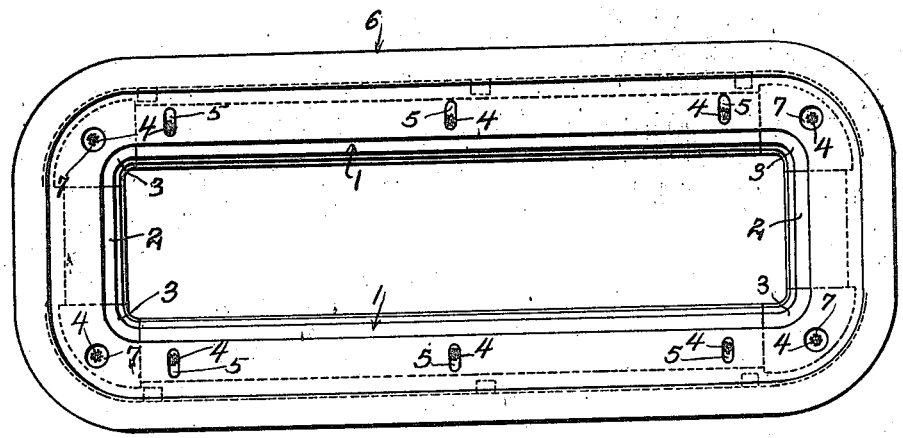
Figure 2 is a top plan view of the spring plate and the follower ring.

The ring includes side sections 1, end sections 2, and arcuate corner sections 3. Sections 1, 2 and 3 are provided, at their inner edges, with downwardly projecting flanges $1^a$, $2^a$ and $3^a$, respectively. These flanges project below top flanges $1^b$, $2^b$ and $3^b$ of sections 1, 2 and 3, respectively and form, in effect, a frame which is adapted to fit snugly about upper mold A as in Figure 1. Side pieces or sections 1 are bored and threaded at $1^c$ through top flanges $1^b$ for reception of securing screws 4 which pass through transversely extending slots 5 provided in a spring plate 6 mounted above the follower ring. This spring plate is of known construction and is attached to the press in a known manner so as to permit proper movement of the press head for operating mold A while exerting downward pressure on the follower ring so as to hold the latter pressed against the upper face of lower mold B. Each corner piece 3 is also bored and threaded for reception of a securing screw which passes through an opening 7 at each corner of spring plate 6, these openings being of greater diameter than the securing screws so as to permit limited universal movement in a horizontal plane of the corner pieces or sections 3. Spring plate 6 is further provided with depending lugs 8 in which are secured dowel pins 9 which fit into corresponding bores 10 provided in web elements 11 formed on the underface of each of the side sections 1. This provides simple and efficient means for connecting the follower ring to the spring plate for movement therewith while also insuring that the follower ring is held in proper relation to mold A and permitting expansion and contraction of the ring.

Each of the corner pieces or sections 3 is provided at each end, on its underface, with a transversely extending flange 12. One flange 12 of each of the corner pieces 3 is secured, at one end of the follower ring, to the adjacent web element 11 of side piece 1 by means of a bolt 13 and nut 14, and a dowel pin 15. The other end flange 12 of one of the corner pieces 3 is secured, in a similar manner, to an end flange 16 provided at one end of end piece 2. A bolt 17 is passed through flange 12 provided at the other end of end piece 2, and an expansion coil spring 18 is mounted about this bolt and is confined between a washer 19 held against outward movement by a nut 20 threaded on the outer end of the bolt and a plate 21 provided with a slot extending longitudinally of the plate through which the bolt extends. Adjacent to its inner end plate 21 is provided with a substantially V-shaped recess 22 extending transversely of the plate, this recess receiving the apex of a V-shaped bearing member 23 which is pressed against the plate by a nut 24 threaded onto a bolt 25 which passes through flanges 16 and 12 and through a slot in the plate. A pin 26 is secured in section 3 and projects between flange 12 and plate 21, this pin being positioned closely adjacent to bolt 25. The pin 26 provides a fulcrum for plate 21 which acts as a lever, spring 18 exerting pressure on the outer end of the plate so as to force the inner end of the plate in a direction away from flange 12 thus forcing corner section 3 and end section 2 toward each other and normally holding the flanges 16 and 12 in close contact. To insure rectilineal movement of sections 2 and 3, a dowel pin 27 is secured through flange 16 and fits snugly through a corresponding opening provided through flange 12, this dowel pin co-operating with bolt 25 to hold the sections in proper relation to each other. At the other end of the ring both of the side pieces 1 are connected to the adjacent corner pieces in the same manner as the first described corner piece is connected to the end piece; and the end section 2 is connected to one of the corner pieces in the same manner. This provides a ring which is capable of expanding both transversely and longitudinally so as to accommodate expansion of the upper mold A. Due to the lever construction employed, the springs 18 exert great pressure so as to normally hold the sections of the ring in contact with each other so that the ring fits snugly about mold section A.

As one of the side sections 1 is rigidly connected at one end to one of the corner sections, and this corner section is rigidly connected to the adjacent end section, these three pieces can, if desired, be formed integrally, though ordinarily I prefer to use the construction illustrated as being more uniform and permitting ready replacement of broken parts. As indicated herein, changes in details of construction and operation of the different parts of the invention may be resorted to without departing from the field and scope of the same, and I intend to include all such variations, as fall within the scope of the appended claims, in this application in which a preferred form only of my invention is disclosed.

What I claim is:—

1. In combination with a spring plate, an expansible follower ring, and connections between the plate and said ring permitting the ring to expand and contract independently of the plate.

2. In combination with a spring plate, a follower ring capable of relatively great expansion, means for normally holding the ring contracted, and connections between the plate and the ring permitting free expansion of the latter.

3. In a device of the character described, a plurality of sections forming a structure adapted to fit about a mold, and means for connecting said sections and for normally holding them together, said means permitting the sections to be forced apart to accommodate expansion of the mold.

4. In a device of the character described, a plurality of sections forming a structure adapted to fit about a mold, and means for connecting said sections and for forcing the same toward each other, said means permitting movement of the sections away from each other to accommodate expansion of the mold.

5. In a device of the character described, a plurality of sections forming a structure adapted to fit about a mold, means for connecting said sections permitting movement of the sections toward and away from each other, and resilient means for forcing the sections toward each other and for permitting the sections to separate to accommodate expansion of the mold.

6. In a device of the character described, a plurality of sections forming a structure adapted to fit about a mold, means for connecting said sections permitting movement of the sections toward and away from each other, and combined spring and lever means for forcing the sections toward each other and for permitting the sections to separate to accommodate expansion of the mold.

7. In a device of the character described, a plurality of sections forming a substantially rectangular structure adapted to fit about a similarly shaped mold, and connections between said sections for forcing the same toward each other, said connections permitting rectilinear movement of the sections away from each other to accommodate expansion of the mold.

8. In a device of the character described, a plurality of sections forming a substantially rectangular structure adapted to fit about a similarly shaped mold, and connections between said sections for forcing the same toward each other, said connections permitting rectilinear movement of the sections away from each other both longitudinally and transversely of the structure to accommodate expansion of the mold.

9. In a device of the character described, a plurality of sections arranged end to end to form a substantially rectangular structure adapted to fit about a similarly shaped mold, certain of the sections being provided at their abutting ends with flanges, a lever plate adjacent to one of the flanges, a bolt passing through the flanges and inserted loosely through said plate, a bearing member secured on the bolt and bearing against the outer face of the plate, a fixed element forming a fulcrum for the plate beyond said bearing member, a bolt passing through the flange and inserted loosely through the plate beyond the fulcrum element, an abutment member secured on the second mentioned bolt, and an expansion spring mounted about the second mentioned bolt and confined between said abutment member and the plate.

In testimony whereof I affix my signature.

STEPHEN W. MANNING.